United States Patent [19]

Ishikawa et al.

[11] Patent Number: 4,957,015
[45] Date of Patent: Sep. 18, 1990

[54] HOLDING MEANS AND BINDING MEANS FOR SELECTOR GEAR SERVO VALVE IN A HYDRAULIC TRANSMISSION

[75] Inventors: Keiichi Ishikawa, Utsunomiya; Shoji Asatsuke, Takanezawa, both of Japan

[73] Assignee: Honda Giken Kogyo Kabushikki Kaisha, Tokyo, Japan

[21] Appl. No.: 244,224

[22] Filed: Sep. 14, 1988

[30] Foreign Application Priority Data

Sep. 17, 1987 [JP] Japan .................................. 62-230999
Sep. 17, 1987 [JP] Japan .................................. 62-231000

[51] Int. Cl.⁵ ........................ B60K 20/14; B60K 41/10
[52] U.S. Cl. .......................................... 74/335; 74/867
[58] Field of Search ................ 74/861, 866, 867, 868, 74/869, 878, 335, 751 C

[56] References Cited

U.S. PATENT DOCUMENTS 3,988,951  11/1976  Mair et al. ......................... 74/869 X
4,495,838  1/1985  Gooch .............................. 74/861 X
4,616,531  10/1986  Ogasawara et al. ................... 74/866

FOREIGN PATENT DOCUMENTS

2025811  8/1978  Fed. Rep. of Germany.
2935877  1/1986  Fed. Rep. of Germany.
61-84450  4/1986  Japan.

Primary Examiner—Leslie A. Braun
Assistant Examiner—Harold F. Macris
Attorney, Agent, or Firm—Armstrong, Nikaido, Marmelstein, Kubovcik & Murray

[57] ABSTRACT

Holding device for holding the selector gear servo valve in the reverse position when the manual valve is in the neutral or parking position and when the manual valve is moved to a forward position, hydraulic pressure in the servo valve overcomes the holding to move the servo valve to a forward position. Additionally, a control valve is provided for binding the servo valve in the reverse position even when the manual valve is moved to the forward position until hydraulic pressure of the hydraulic clutch for the second transmission train reaches a predetermined level.

6 Claims, 6 Drawing Sheets

HOLDING MEANS AND BINDING MEANS FOR SELECTOR GEAR SERVO VALVE IN A HYDRAULIC TRANSMISSION

BACKGROUND OF THE INVENTION

The present invention relates to a control apparatus for a hydraulically operated vehicular transmission comprising a plurality of forward transmission trains which are established respectively by individual hydraulic clutches, a reverse transmission train which shares for common use a hydraulic clutch with one of the forward transmission trains, and a selector device that is switchable to a forward side in which the forward transmission trains are established and to a reverse side in which the reverse transmission train is established.

There has been known, as disclosed in Japanese Pat. Application, Laid-open No. 84450/1986, a control apparatus for a hydraulically operated vehicular transmission wherein, for example, the highest speed forward transmission train and a reverse transmission train share a hydraulic clutch, the highest speed forward transmission train and reverse transmission train are selectively established by a selector device, and a hydraulic circuit equipped with a manual valve switchable to a forward position and to a reverse position is provided with a servo valve for forward/reverse switchover which is connected to the selector device so that when the manual valve is operated for switchover to the reverse position, the servo valve is switched over to a reverse location at which the selector device is set to the reverse side and at the same time oil is supplied to a hydraulic clutch for the highest speed transmission train so as to establish the reverse transmission train.

Here, the servo valve is urged by a spring to the forward location at which the selector device is set to the forward side. When the manual valve is switched over from the reverse position to the neutral or parking position, the servo valve is returned from the reverse location to the forward location by the resilient force of the spring, and the servo valve is bound to be in the forward location by hydraulic pressure as the manual valve is switched over to the forward position.

With the above-described type of the apparatus, there is a problem that a clicking noise occurs when the manual valve is switched over from the reverse position to the neutral or parking position.

The cause for this noise is described below in conjunction with an apparatus of the type in which the common-use hydraulic clutch for the highest speed forward transmission train and the reverse transmission train is provided on the input shaft of the transmission and the selector device is provided on the output shaft of the transmission.

When the servo valve is returned from the reverse location to the forward location by the resilient force of the spring as the manual valve is switched over, there occurs in the course of the switchover a neutral condition in which the sleeve of the selector device is not engaged with the gear of the reverse transmission train nor with the gear of the highest speed forward transmission train. Even when rotation of the output shaft is stopped by braking under such a condition, the input shaft is subjected to no load and thus rotates. The gear of the highest speed forward transmission train is also rotated, via the common-use hydraulic clutch, by the rotation of the input shaft since the common-use clutch is not yet complete disengaged immediately after the switchover of the manual valve whereas the selector device sleeve has stopped rotation as has the output shaft. Consequently, both come to be intermeshed with each other while relatively rotating, so that noise is generated from them striking against each other.

In case where the apparatus has the hydraulic clutch provided on the output shaft and the selector device provided on the input shaft, when the selector device sleeve is moved to the neutral condition, the selector device sleeve rotates together with the input shaft while the gear of the highest speed forward transmission train does not rotate since it is connected through the hydraulic clutch to the output shaft which is stopped from rotating, so that both also come to be intermeshed with each other while relative rotating as in the situation described in the foregoing, and as a result, noise is also generated.

In such a case, one possibility is to employ a synchromesh type selector device for preventing generation of such a noise. However, this results in a high cost problem.

It is, therefore, the first object of the present invention to provide the apparatus which prevents generation of such noise through a partial improvement of the servo valve.

Also, when the manual valve is switched over from the reverse position to the forward position, there is generated a noise for the same reasons as above. In addition, when a vehicle is unable to move out because its driving wheel is caught in a muddy spot, switchover operation of the manual valve from the forward position to the reverse position and vice versa is performed while the accelerator pedal is continually pressed so as to get out of the spot, as occasion demands. In such a case, since the driving wheel is slipping as it revolves, the selector device sleeve and the gear of the highest speed forward transmission train would be compelled to be intermeshed with each other while they are rotating in mutually opposite directions when the servo valve is switched over from the reverse location to the forward location as the manual valve is operated for switchover from the reverse position to the forward position. This causes a revolution speed difference between the two to become greater at the time of their intermeshing and thus results in wear of the intermeshing portions of the gears. It is, therefore, the second object of the present invention to get rid of such drawback.

SUMMARY OF THE INVENTION

To achieve the first object described above, the present invention provides a control apparatus for a hydraulically operated vehicular transmission comprising a plurality of forward transmission trains which are established respectively by individual hydraulic clutches, a reverse transmission train which shares for common use a hydraulic clutch with a predetermined first one of the forward transmission trains, and a selector device which is switchable to a forward side in which said first forward transmission train is established and to a reverse side in which said reverse transmission train is established. A hydraulic circuit is provided with a servo valve for forward/reverse switchover which is connected to the selector device so that, when a manual valve provided in said hydraulic circuit is operated for switchover to a reverse position, the servo valve may be pushed by hydraulic pressure to the reverse location at which the selector device sleeve is set to the reverse side and at the same time oil may be supplied to the hydraulic clutch for said first transmission train. The control apparatus is characterized in that a holding means is provided to hold the servo valve in the reverse location so that, when the manual valve is switched over from the reverse position to a neutral or parking position, the servo valve may be held in the reverse location by the holding means and, when the manual valve is switched over to the forward position, the servo valve may be pushed by the hydraulic pressure to the forward location at which the selector device sleeve is set to the forward side.

Further, to achieve the second object described above, the present invention provides a control apparatus for a hydraulically operated vehicular transmission as described above for achieving the first object, wherein there is further provided a binding means which, when the manual valve is operated for switchover to the forward position, binds the servo valve to remain in the reverse location by shutting out inputting of the hydraulic pressure to the servo valve until a hydraulic clutch for a second transmission train attains a predetermined level of the hydraulic pressure, said second transmission train being, among the forward transmission trains, the very one to which supplying of the oil is started with the switchover of the manual valve.

The operation of the present invention designed to achieve the second object described above will now be described with reference to the control apparatus of the type in which the hydraulic clutch used commonly by the first transmission train and the reverse transmission train is provided on the input shaft of the transmission and the selector device is provided on the output shaft of the transmission.

When the manual valve is switched over from the reverse position to the neutral or parking position, the servo valve is held in the reverse location by the holding means, so that the selector device sleeve is not switched over from the reverse side to the forward side and therefore no noise is generated.

With the manual valve switched over from the reverse position to the forward position, the oil is supplied to the hydraulic clutch for the second transmission train and the hydraulic pressure of the hydraulic clutch increases gradually. When this hydraulic pressure of the clutch has increased to reach a predetermined level, operation of the binding means ceases to allow the hydraulic pressure to be inputted to the servo valve. The servo valve is then pushed by this hydraulic pressure and moves from the reverse location to the forward location against the holding force of the holding means.

While the servo valve is being moved as above, there occurs a condition in which the selector device sleeve is not engaged with the gear of the reverse transmission train nor with that of the first transmission train. If the rotation of the output shaft of the transmission is stopped by braking under this condition, rotation of the input shaft of the transmission is stopped through the engagement force of the hydraulic clutch for the second transmission train. Consequently, the gear of the first transmission train is not caused to rotate through the common-use hydraulic clutch and such device sleeve and the selector gear are smoothly intermeshed with each other in a condition in which they are not relatively rotating, so that noise which can be generated from their striking against each other is prevented.

On the other hand, when the manual valve is switched over from the reverse position to the forward position in a condition in which the accelerator pedal is being pressed, the servo valve is switched over from the reverse location to the forward location in a condition such that rotation in the reverse rotational direction of the output shaft of the transmission is checked by torque in the regular rotational direction transmitted thereto through the second transmission train with the hydraulic pressure increase of the hydraulic clutch for the second transmission train. Furthermore, the hydraulic pressure in the common-use hydraulic clutch is lowered sufficiently at the time of the actual switchover of the servo valve due to a time lag existing from the switchover of the manual valve to that of the servo valve. As a result, the first transmission train device sleeve and the selector gear become intermeshed with each other without giving rise to large relative rotations, so that wearing of the intermeshing portions of the two is prevented.

Even with the apparatus of the type in which the common-use hydraulic clutch is provided on the output shaft and the selector device is provided on the input shaft, the same operation as is described above can be obtained.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF THE PREFERRED EMBODIMENT

Figure 1:
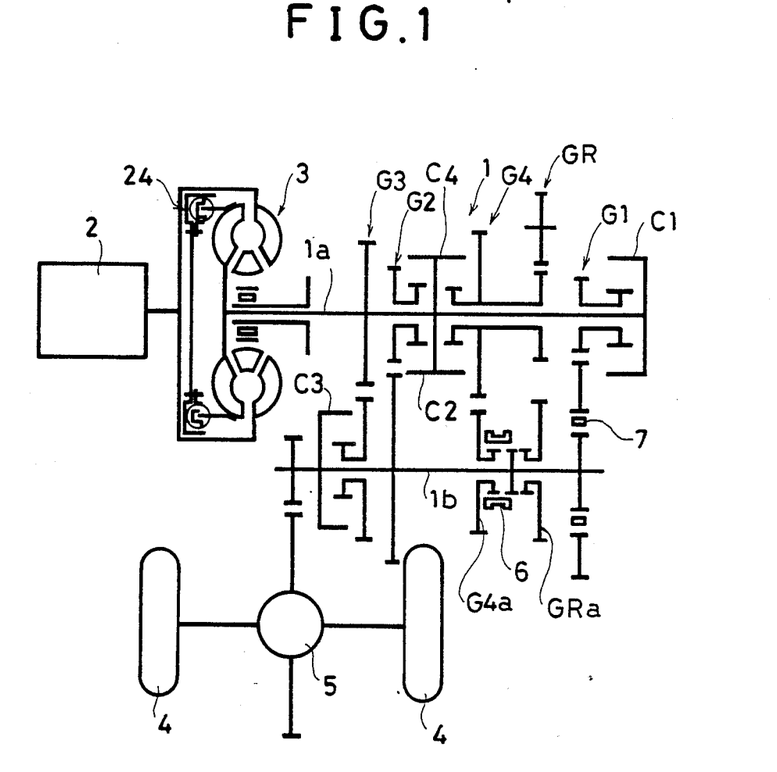
FIG. 1 is a schematic diagram of an example of transmission to which the present invention is applied.
Figure 2:
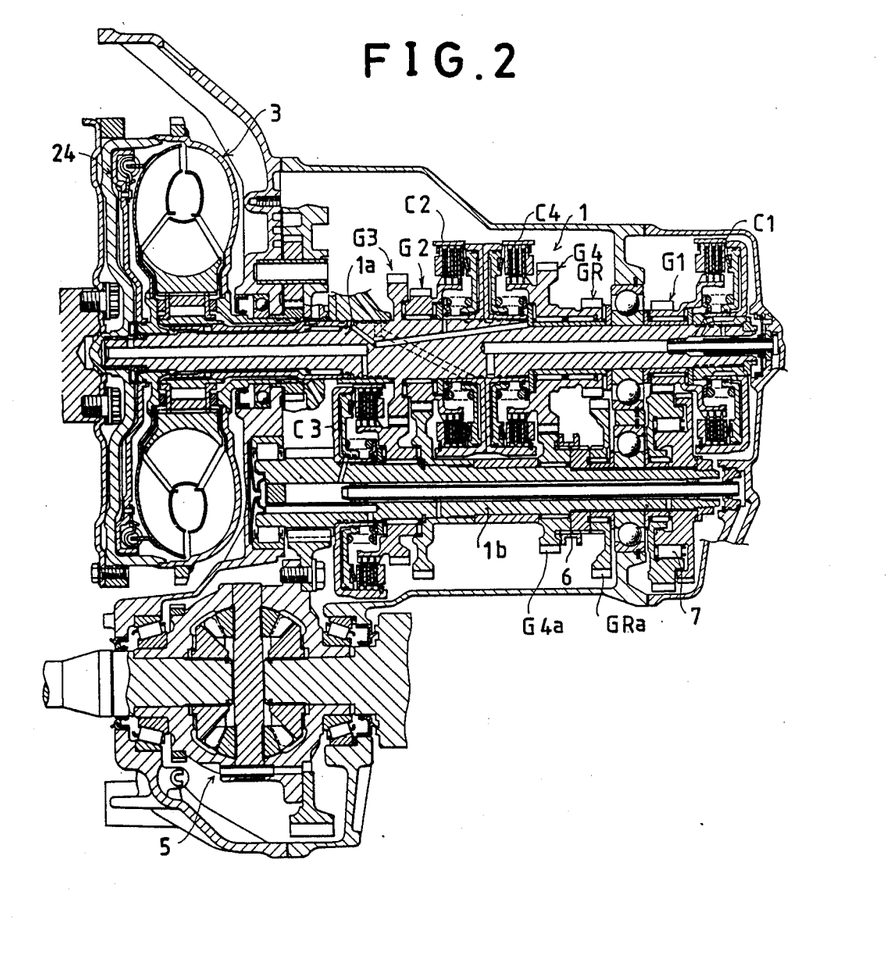
FIG. 2 is a longitudinal sectional view of the transmission.

Referring to FIGS. 1 and 2, a transmission for carrying out the changing of a vehicle speed to four forward speeds and one reverse speed comprises first to fourth forward speed transmission trains, G1, G2, G3, G4 and a reverse transmission train GR provided between an input shaft 1a connected to an engine 2 via a hydraulic torque converter 3 and an output shaft 1b connected to the driving wheels 4 of a vehicle via differential gear 5. The forward speed transmission trains G1, G2, G3, G4, have first to fourth speed hydraulic clutches C1, C2, C3, C4, each constituting a hydraulic engaging element and interposed respectively therein, so that the transmission train G1, G2, G3, G4 may be selectively established by the engagement of the respective hydraulic clutches C1, C2, C3, C4. The reverse transmission train GR and the fourth-speed transmission train G4 commonly use the fourth-speed hydraulic clutch C4 mounted on the input shaft $1a$. These transmission trains G4, GR are established selectively by shifting a selector device sleeve 6, which is mounted on the output shaft $1b$, to a forward side or the left-hand side in the drawing to have the sleeve 6 engaged with a counter gear G4a for the transmission train G4, and to a reverse side or the right-hand side in the drawing to have the sleeve 6 engaged with a counter gear GRa for the transmission train GR, respectively.

A one-way clutch 7 is interposed in the first-speed transmission train G1 and adapted to operate so as to allow the over-revolution of the output shaft $1b$.

Figure 3:
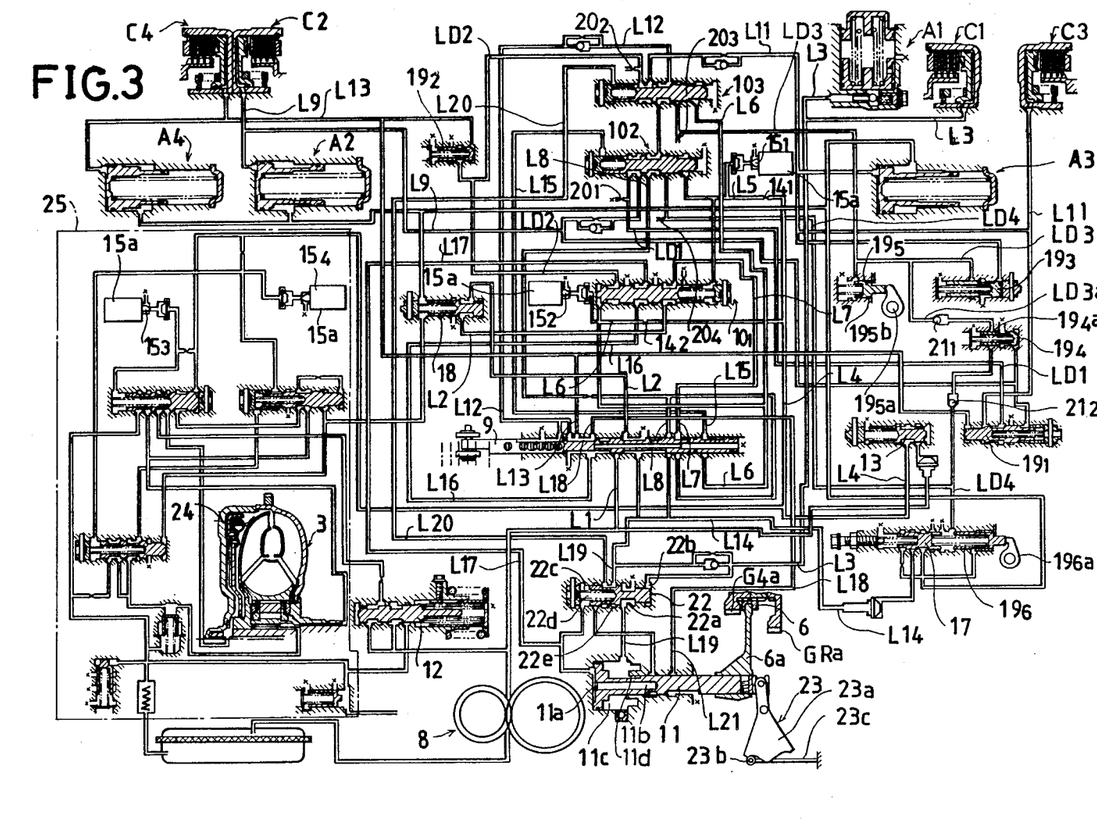
FIG. 3 is a hydraulic circuit diagram thereof.

The supplying and discharging of the oil to and from the hydraulic clutch C1, C2, C3, C4 are controlled by the hydraulic circuit showing in FIG. 3. This will now be described in detail. The hydraulic circuit is provided with a hydraulic power source 8; a manual valve 9 switchable to the six positions clearly shown in FIG. 4, namely, a parking position P, a reverse position R, a neutral position N and three forward positions including automatic speed changing positions D and S and a second speed retaining position 2; a first shift valve $10_1$ for switchover between first and second speeds; a second shift valve $10_2$ for switching over between second and third speeds; a third shift valve $10_3$ for switchover between third and fourth speeds; and a servo valve 11 for switchover between forward and reverse drives. The servo valve 11 is connected to the selector sleeve 6 via a fork $6a$ engaged therewith. With the manual valve 9 set to the D position, No. 1 oil passage L1 which is for supplying oil and communicates with the hydraulic power source 8 is connected via an annular groove $9a$ of the valve 9 to No. 2 oil passage L2 communicating with the first shift valve $10_1$ and to No. 14 oil passage L14 which is to be described in detail later. Pressure oil having the pressure regulated to a predetermined line pressure by a regulator valve 12 is supplied from the No. 1 oil passage L1 to the No. 2 oil passage L2. Consequently, the supplying of oil to the first speed hydraulic clutch C1 through No. 3 oil passage L3 branching off from the No. 2 oil passage L2, and the supplying of oil to the second to fourth speed hydraulic clutches C2, C3, C4, through the first to third shift valves $10_1$, $10_2$, $10_3$ are carried out.

The first shift valve $10_1$ is formed so as to be switchable to the right-hand first speed position and the left-hand second speed position. The second shift valve $10_2$ is switchable to the right-hand second speed position and the left-hand third speed position. The third shift valve $10_3$ is switchable to the right-hand third speed position and the left-hand fourth speed position. A modulator pressure (a predetermined pressure lower than the line pressure) from a modulator valve 13 connected with the No. 1 oil passage L1 is inputted into the right end oil chamber $10_{1a}$, $10_{2a}$ in the first and the second shift valves $10_1$, $10_2$ through No. 5 oil passage L5, which communicates with No. 4 oil passage L4 on the output side of the modulator valve 13 via an orifice $13_1$, and into a left-end oil chamber $10_{1b}$ in the first shift valve $10_1$ and a right-end oil chamber $10_{3a}$ in the third shift valve $10_3$ through No. 6 oil passage L6 which communicates with the No. 4 oil passage L4 via another orifice $14_2$. electromagnetic normally-closed type first open-air valve $15_1$ is connected to the No. 5 oil passage L5, and an electromagnetic normally-closed type second open-air valve $15_2$ to the No. 6 oil passage L6, so that these shift valves $10_1$, $10_2$, $10_3$ may be switched as described in the following according to each selected speed by opening and closing the two open-air valves $15_1$, $15_2$.

At the first speed, the first open-air valve $15_1$ is opened and the second open-air valve $15_2$ is closed. As a result, the inputting of the modulator pressure into the right-end oil chambers $10_{1a}$, $10_{2a}$ in the first and second shift valves $10_1$, $10_2$ is discontinued and modulator pressure is inputted into the left-end oil chamber $10_{1b}$ in the first shift valve $10_1$ and the right-end oil chamber $10_{3a}$ in the third shift valve $10_3$. Consequently, the first shift valve $10_1$ is switched to the right-hand first speed position against a right-end spring $10_{1c}$, the second shift valve $10_2$ is switched to the right-hand second speed position by the resilient force of a left-end spring $10_{2c}$ applied thereto, and the third shift valve $10_3$ is switched to the left-hand fourth speed position against a left-end spring $10_{3c}$. In this condition, the communication between the No. 2 oil passage L2 on the inlet side of the first shift valve $10_1$ and No. 7 oil passage L7 on the outlet side thereof is discontinued, and the oil is supplied only to the first speed hydraulic clutch C1 through the No. 14 oil passage L14 and the No. 3 oil passage L3, so that the first speed transmission train G1 is established.

At the second speed, both the first and second open-air valves $15_1$, $15_2$ are opened. As a result, the inputting of the modulator pressure into the left-end oil chamber $10_{1b}$ in the first shift valve $10_1$ and the right-end oil chamber $10_{3a}$ in the third shift valve $10_3$ is discontinued, and the first and third shift valves $10_1$, $10_3$ are switched to the left-hand second speed position and right-hand third speed position, respectively, by the resilient force of the springs $10_{1c}$, $10_{3c}$ applied thereto while the second shift valve $10_2$ is retained in the second speed position in the same manner as mentioned above. In this condition, the No. 2 oil passage L2 is communicated with the No. 7 oil passage L7 through an annular groove $10_{1d}$ in the first shift valve $10_1$. The oil is thus supplied to the second speed hydraulic clutch C2 through No. 8 oil passage L8, which is communicated with the No. 7 oil passage L7 via a groove $9b$ in the manual valve 9 when the valve 9 is in the D position, and through the No. 9 oil passage L9, which is communicated with the No. 8 oil passage L8 via an annular groove $10_{2d}$ in the second shift valve $10_2$ when the valve $10_2$ is in the second speed position so that the second speed transmission train G2 is established. In this case, the transmission of power via a first speed transmission train G1 is stopped automatically due to the operation of the one-way clutch 7.

At the third speed, the first open-air valve $15_1$ is closed, and the second open-air valve $15_2$ is opened. As a result, the modulator pressure is inputted into the right-end oil chambers $10_{1a}$, $10_{2a}$ in the first and second shift valves $10_1$, $10_2$, and the second shift valve $10_2$ is switched over to the left-hand third speed position against the spring $10_{2c}$ with the first and third shift valves $10_1$, $10_3$ being retained in the second and third speed position. In this condition, the No. 9 oil passage L8 is communicated with No. 10 oil passage L10, which is communicated with the third shift valve $10_3$ through an annular groove $10_{2e}$ in the second shift valve $10_2$, and the oil is supplied to the third speed hydraulic clutch C3 through No. 11 oil passage L11, which is connected via an annular groove $10_{3d}$ in the third shift valve $10_3$ with the No. 10 oil passage L10 when the third shift valve $10_3$ is in the third speed position. Also, the No. 9 oil passage L9 communicating with the second speed hydraulic clutch C2 is communicated with No. 1 discharge oil passage LD1 via the annular groove $10_{2d}$ in the second shift valve $10_2$, so that the discharging of the oil from the second speed hydraulic clutch C2 is carried out, whereby the third speed transmission train G3 is established.

At the fourth speed, both the first and second open-air valves $15_1$, $15_2$ are closed. As a result, the first and second shift valves $10_1$, $10_2$ are retained in the second and the third speed positions, respectively, in the same manner as at the third speed, and the third shift valve $10_3$ is switched over to the left-hand fourth speed position by virtue of the modulator pressure inputted into the right-end oil chamber $10_{3a}$ in the third shift valve $10_3$. As for the first shift valve $10_1$, it is kept at the second speed position by the resilient force of the spring $10_{1c}$, in that the modulator pressure inputted into the oil chambers $10_{1a}$, $10_{1b}$ located at both ends thereof makes the left-side and right-side biasing forces resulting from the modulator pressure balanced between each other. In this condition, the No. 10 oil passage L10 is connected with No. 12 oil passage L12 through an annular groove $10_{3e}$ in the third shift valve $10_3$, and the oil is supplied to the fourth speed hydraulic clutch C4 through No. 13 oil passage L13 which gets connected with the No. 12 oil passage L12 through a groove 9c in the manual valve 9 when the manual valve 9 is in the D position. Also, the No. 11 oil passage L11 communicating with the third speed hydraulic clutch C3 is communicated with a second discharge oil passage LD2 through the annular groove $10_{3d}$ in the third shift valve $10_3$, so that the discharging of the oil from the third speed hydraulic clutch C32 is carried out, whereby the fourth speed transmission train G4 is established.

When the fourth speed is shifted down to the third speed, the No. 12 oil passage L12 is connected, through the annular groove $10_{3e}$ in the third shift valve $10_3$ which is in the third speed position, to the No. 3 discharge oil passage LD3 to discharge the oil from the fourth speed hydraulic clutch C4. When the third speed is shifted down to the second speed, the No. 10 oil passage L10 communicated with the No. 11 oil passage L11 through the annular groove $10_{3d}$ in the third shift valve $10_3$ which is in the third speed position is communicated with No. 4 discharge oil passage LD4 through the annular groove $10_{2e}$ in the second shift valve $10_2$ which is in the second speed position so as to discharge the oil from the third speed hydraulic clutch C3. When the second speed is shifted down to the first speed, the No. 7 oil passage L7, which is communicated with the No. 2 oil passage L2 at the second speed as mentioned above, is communicated with an oil discharge port $10_{1e}$ through the annular groove $10_{1d}$ in the first shift valve $10_1$ to the first speed position is performed, so that the discharging of the oil from the second speed hydraulic clutch C2 is carried out through the No. 9, No. 8 and No. 7 oil passage L9, L8, L7 since the No. 7 oil passage L7 is communicated with the second speed hydraulic clutch C2 through the No. 8 and No. 9 oil passages L8, L9 in the same manner as at the second speed.

Figure 5:
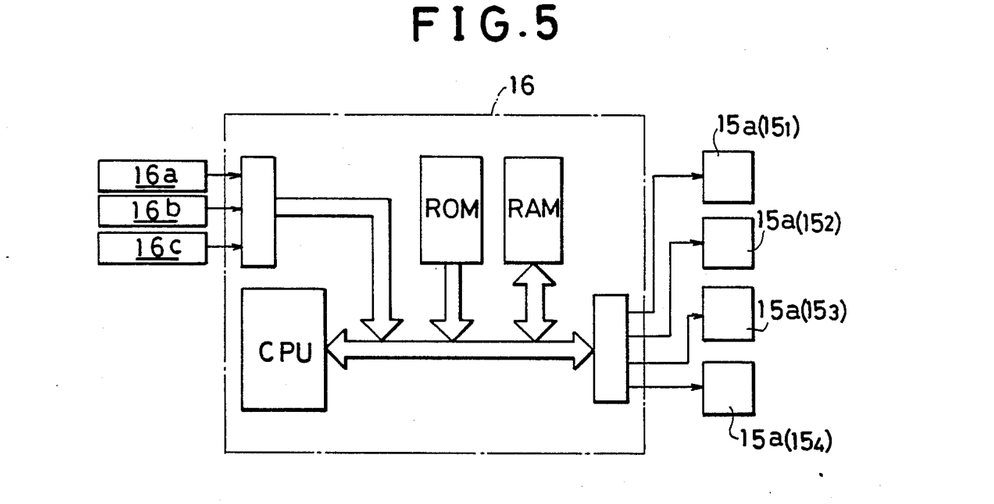
FIG. 5 is a block schematic diagram of an electric control circuit.
Figure 6:
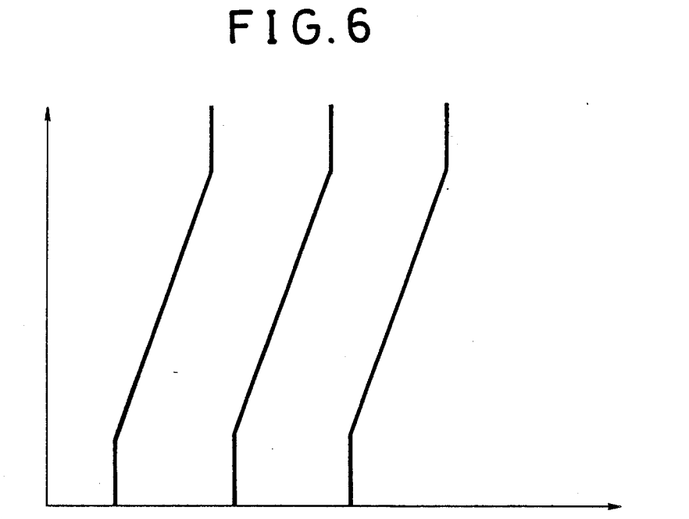
FIG. 6 is a diagram of the speed change characteristics in D position in the manual valve.

As described above, with the manual valve 9 in the D position, the first to fourth speed transmission trains are selectively established by opening and closing the first and second open-air valves $15_1$, $15_2$. A signal from an engine throttle valve opening sensor 16a (or a signal representative of the vacuum pressure in the intake passage relative to the engine load may also be used), a signal from a vehicle speed sensor 16b and a signal from a position sensor 16c for the manual valve 9 are inputted into an electronic control circuit 16 consisting of a microcomputer as shown in FIG. 5, so that the opening and closing of the open-air valves $15_1$, $15_2$ are controlled by energizing and de-energizing solenoids 15a thereof through the electronic control circuit 16 in such a way that the speed change characteristics shown in, for example, FIG. 6 can be obtained.

Referring to the drawings, reference symbols A1, A2, A3, A4 denote accumulators provided so as to lessen any sudden pressure variation during the supplying and discharging of the oil to and from the hydraulic clutches C1, C2, C3, C4. A throttle valve 17 is adapted to regulate line pressure, which is inputted from No. 14 oil passage L14 communicating with the No. 1 oil passage L1 through the manual valve 9, to such a throttle pressure according to the degree of opening of the throttle valve, and then output the resultant line pressure. The throttle pressure from the throttle valve 17 is applied as a back pressure to the second to fourth speed accumulators A2, A3, A4. A reducing valve 18 adapted to be pressed toward the right-hand opening side by the throttle pressure is interposed in the No. 2 oil passage L2 so as to reduce the pressure, which is supplied to the downstream side of the No. 2 oil passage L2, in the region of a low degree of opening of the throttle. This reducing valve 18 is known from Japanese Pat. Laid-open No. 166750/1984, and a detailed description thereof will be omitted herein.

The discharge oil passages LD1, LD2, LD3, LD4 are respectively provided therein with the discharge oil control valves $19_1$, $19_2$, $19_3$, $19_4$ and orifices $20_1$, $20_2$, $20_3$, $20_4$ which are disposed in parallel with the valves $19_1$–$19_4$, so that the resistances in the discharge oil passages LD1, LD2, LD3, LD4 can be increased and decreased by closing and opening the control valves $19_1$, $19_2$, $19_3$, $19_4$.

This will now be described more in detail. The second discharge oil control valve $19_2$, which is interposed in the second discharge oil passage LD2 connected to the third speed hydraulic clutch C3 when the third speed is shifted up to the fourth speed is pressed toward the left-hand opening side by the hydraulic pressure (which hereinafter referred to as fourth speed pressure) from the fourth speed hydraulic clutch C4 on the engaged side. When the third speed is shifted up to the fourth speed, the fourth speed pressure increases to a predetermined level to open control valve $19_2$, so that there can be caused a difference in sharpness of the pressure dropping characteristic of the hydraulic pressure (which will hereinafter be referred to as third speed pressure) in the third speed hydraulic clutch C3 on the disengaged side between before and after opening of the valve $19_2$. Thus, the time for disengaging the third speed hydraulic clutch C3 is properly controlled, so that the speed change can be carried out smoothly without causing engine racing or the stalling of the engine attributable to an excessive concurrent coupling of the clutches. When the fourth speed is shifted down to the third speed, the third discharge oil control valve $19_3$ interposed in the third discharge oil passage LD3 connected to the fourth speed clutch C4 through third shift valve $10_3$ is pressed toward the left-hand opening side by the third speed pressure at the engaged side and opened due to the increased third speed pressure. The control valve $19_3$ thus functions to carry out the fourth to third speed shift down operation smoothly in the same manner as mentioned above. Under certain travelling conditions, for example, when the accelerator is suddenly operated, the speed change characteristic are set so that the speed is changed between the second and fourth speeds skipping over the third speed. To smoothly carry out such a speed changing operation, the first discharge oil control valve $19_1$ provided in the first discharge oil passage LD1 which corresponds to the second speed hydraulic clutch C2 is adapted to be pressed toward the right-hand opening side by the third speed pressure and fourth speed pressure as known from Japanese Pat. Laid-open No. 84450/1986, in such a manner that the control valve $19_1$ can deal with both a second to third speed increasing action and a second to fourth speed increasing action. The control valve $19_1$ is also adapted to be pressed toward the left-hand closing side by the hydraulic pressure (which will hereinafter be referred to as second speed pressure) from the second speed hydraulic clutch C2 and opened when a difference between the pressure at the disengaging side and that at the engaging side has become not more than a predetermined level due to the decrease of the second speed pressure at the disengaging side and the increase of the third and fourth speed pressures at the engaging side during a change of the second speed to the third speed and a change of the second speed to the fourth speed. Such a differential pressure-responding type discharge oil control valve is known from Japanese Pat. Application Laid-open No. 82051/1986.

The fourth discharge oil control valve $19_4$, which is provided in the No. 4 discharge oil passage LD4 communicated with the third speed hydraulic clutch C3 when the third speed is shifted down to the second speed, is adapted to be pressed toward the left-hand opening side by the second speed pressure at the engaging side. In order that the control valve $19_4$ can also deal with a speed change from the fourth speed to the second speed, the third discharge oil passage LD3 communicating with the fourth speed hydraulic clutch C4 is communicated with a common inlet port $19_{4a}$ of the control valve $19_4$ through a branch passage LD3a so that the control valve $19_4$ is provided in the third discharge oil passage LD3 in parallel with the third discharge oil control valve $19_3$, whereby the fourth speed pressure at the disengaging side decreases speedily due to the increase of the second speed pressure at the engaging side even when the fourth speed is shifted down to the second speed. Here in order to prevent it from happening that, when the third speed is shifted down to the second speed, the oil in the third speed hydraulic clutch C3 may be caused to be discharged from an orifice $20_3$ via said inlet port $19_{4a}$ from the fourth discharge oil passage LD4, and the third discharge oil passage LD3 before the fourth discharge oil control valve $19_4$ is opened and as a result, a pressure of the third speed pressure may become larger than the pressure decreases characteristic governed by an orifice $20_4$ in the fourth discharge oil pressure LD4, a check valve $21_1$ for checking a back flow of the oil from the fourth discharge oil passage LD4 is interposed in the branch passage LD3a and a check valve $21_2$ for checking a back flow of the oil from the third discharge oil passage LD3 is likewise interposed in the fourth discharge oil passage LD4.

A speed reducing operation in the region of low degree of opening of the throttle can be carried out more smoothly if the pressure in the clutch at the disengaging side is rapidly reduced. Accordingly as known from Japanese Pat. Application Laid-open No. 127956/1986, a fifth discharge oil control valve $19_5$, which is adapted to be opened with a low degree of opening of the throttle, is provided in the third discharge oil passage LD3 in parallel with the third discharge oil control valve $19_3$, and a sixth discharge oil control valve $19_6$, which is adapted to be opened with a low degree of opening of the throttle, is provided in the fourth discharge oil passage LD4 in parallel with the fourth discharge oil control valve $19_4$. The sixth discharge oil control valve $19_6$ is made of plunger pressing the throttle valve 17 and is adapted to be moved toward the left-hand closing side by an operator $19_{6a}$ which is actuated in accordance with the degree of opening of the throttle. The fifth discharge oil control valve $19_5$ is also formed so that it is pressed toward the left-hand closing side by an operator $19_{5a}$ which is actuated in accordance with the degree of opening of the throttle. Thus, when the degree of opening of the throttle is low, these control valves $19_5$, $19_6$ are returned to the right-hand opening positions, and the third speed pressure and fourth speed pressure decrease speedily by the discharge oil flowing through these valves $19_5$, $19_6$ when the speed is reduced from the third speed, and from the fourth speed to the second speed. The fifth discharge oil control valve $19_5$ is provided at the right end outer circumferential portion thereof with a small-diameter stepped portion $19_{5b}$, through which the third discharge oil passage LD3 is communicated with a right-hand atmospheric air communicating port when the degree of opening of the throttle is high, to speed up the reduction of the fourth speed pressure during the reduction of the speed from the fourth speed to a lower speed.

In general, the speed change characteristics are set so that, as degree of opening of the throttle increased, the speed changing is done in higher vehicle speed region. In such a case, the quantity of variations of the number of revolutions per minute of the engine before and after the speed changing operation increases as the vehicle speed becomes higher. Therefore, when the speed is shifted down during a high degree of opening of the throttle, the pressure in the clutch at the high speed side is reduced early to form a neutral state for a short period of time below low speed travelling condition based on the increase of the pressure in the clutch at the low speed side has been established. In this neutral state, the engine should be raced to increase the engine revolution somewhat so that a difference between the revolutions at the input side of the low speed hydraulic clutch and those at the output side thereof decreases to have this clutch engaged smoothly. This enables the clutch to be engaged smoothly and also enables the speed reduction to be carried out smoothly.

When the third speed has been shifted down to the first speed, the second discharge oil control valve $19_2$, which is interposed in the second discharge oil passage LD2 communicating with the third speed hydraulic clutch C3, is not opened. If the valve $19_2$ is left as it is, the discharging of the oil is done only from the orifice $20_2$ and the reduction of the third speed pressure delays. Consequently, it takes much time to establish the first speed transmission train G1 when the kick-down speed changing, in which the accelerator pedal is pressed to shift the third speed down to the first speed, is done, and the acceleration decreases. In order to prevent this inconvenience, the second discharge oil passage LD2 is constructed such that it may be communicated with an oil discharge port $10_{1g}$ through the annular recess $10_{1f}$ formed in the same valve $10_1$ when the first shift valve $10_1$ is in the first speed position. As a result, the oil in the third speed hydraulic clutch C3 is discharged from the oil discharge port $10_{1g}$ without throttle resistance when such kick-down speed changing is done, so that the first-speed transmission train G1 can be established without a time lag. The first speed hydraulic clutch C1 is constantly engaged in the D position of the manual valve 9, and the first speed transmission train G1 is established when the third speed hydraulic clutch C3 is disengaged.

Figure 7:
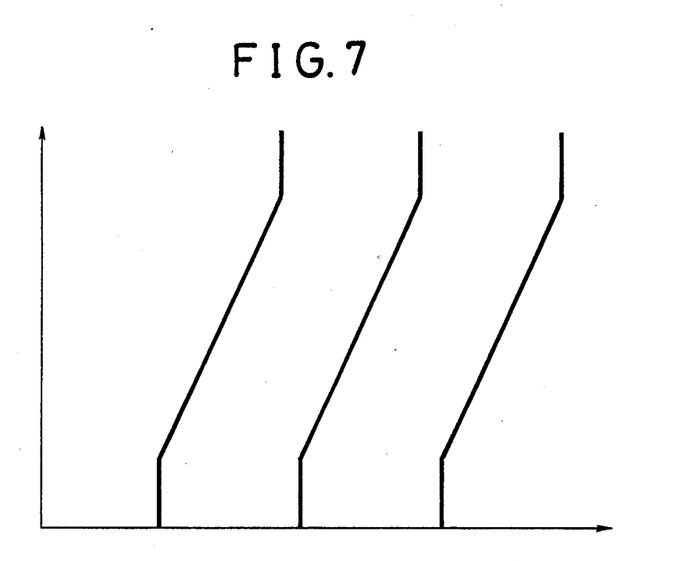
FIG. 7 is a diagram of the speed change characteristics in S position in the manual valve.

The above is a description of the construction of the oil passages formed when the manual valve 9 is in the D position. When the manual valve is in the S position, the oil passages are also formed in the same manner as in the case where the manual valve 9 is in the D position. In this case, the speed change characteristics stored in the electronic control circuit 16, which is adapted to open and close the first and second open-air valves $15_1$, $15_2$ are changed to carry out a speed change automatically between the first to fourth speeds with the speed change characteristics shown in, for example, FIG. 7. The speed change characteristics shown in FIG. 7 are set so that the speed changing is done at the higher speed side as compared with the speed changing done in accordance with the speed change characteristics shown in FIG. 6. Namely, the speed change characteristics shown in FIG. 7 are set so that they are suitable for the sporty travelling and mountain travelling.

In the D position, the No. 7 and No. 8 oil passages L7, L8 are communicated with each other through the groove 9b in the manual valve 9, while in the S position, they are communicated with each other through the annular groove 9d in the same valve 9.

In the 2 position of the manual valve 9, the No. 14 oil passage L14 communicating with the No. 1 oil passage L1 through the groove 9e in the valve 9 is communicated with the No. 8 oil passage L8 through the annular groove 9d in the valve 9, and the line pressure is inputted into the second shift valve $10_2$ without passing through the first shift valve $10_1$. In the 2 position, both the first and second open-air valves $15_1$, $15_2$ are opened, and the second shift valve $10_2$ is in the right-hand second speed position. The No. 8 oil passage L8 is communicated with the No. 9 oil passage L9 and the oil is supplied to the second speed hydraulic clutch C2, so that the second speed transmission train G2 is established.

In the 2 position, the second oil passage L2 is communicated with an oil discharge port 9f, which consists of an axial bore formed in the manual valve 9, through a groove 9g in the same valve 9. In the D and S positions, chamber $10_{2b}$ in the second shift valve $10_2$, which has been communicated with the oil discharge port 9f via a groove 9h in the manual valve 9, is communicated with the No. 6 oil passage L6 through an annular groove 9i in the manual valve 9, so that the hydraulic pressure in the oil chamber $10_{2b}$ becomes ready to be controlled by the second open-air valve $15_2$. The purpose of providing this arrangement is to establish the second speed transmission train G2 by setting the manual valve 9 to the 2 position, and thereby obtain a strong driving force even when an electric current has become unable to be supplied to the solenoids 15a in the first and second open-air valves $15_1$, $15_2$ to be left closed (fourth speed travelling condition in the D and S positions). Namely, in the 2 position, even when the modulator pressure is inputted into the right end oil chamber $10_{2a}$ in the second shift valve $10_2$ due to the first open-air valve $15_1$ being closed, the modulator pressure is inputted into the left-hand oil chamber $10_{2b}$ as well, due to the second open-air valve $15_2$ being closed.

Consequently, the biasing force at the left and right sides based on the modulator pressure is balanced, and the second shift valve $10_2$ is switched over to the right-hand second speed position due to the resilient force of the spring $10_{2c}$, so that the supplying of the oil to the second speed hydraulic clutch C2 is accomplished.

The purpose of supplying the oil to the second speed hydraulic clutch C2 through the second shift valve $10_2$ in the 2 position is to enable the third speed transmission train G3 to be established depending upon the program in the electronic control circuit even in the 2 position. When the manual valve 9 is switched over to the 2 position while the vehicle travels at a high speed with the valve 9 set to either of the D and S position, the overrunning of the engine or a large speed change shock occurs in some cases. In order to prevent this inconvenience, it is necessary to develop a method capable of establishing the third speed transmission train G3 when the vehicle travels at, for example, a vehicle speed not lower than a predetermined level even in the 2 position.

In the R position of the manual valve 9, the No. 1 oil passage L1 is communicated with No. 16 oil passage L16 which is communicated with the first shift valve $10_1$ via a groove 9j in the manual valve 9. In this case, through operation of the electronic control circuit 16, the first open-air valve $15_1$ is closed while the second open-air valve $15_2$ is opened (the third speed travelling condition in the D and S positions), with the first shift valve $10_1$, switched over to the left-hand second speed position. Therefore, the No. 16 oil passage L16 is communicated through the annular groove $10_{1h}$ in the valve $10_1$ with No. 17 oil passage L17 communicating with left end first oil chamber 11a in the servo valve 11. The servo valve 11 is moved to the right-hand reverse location by the line pressure inputted thereinto through the No. 17 oil passage L17. Consequently, the selector device sleeve 6 joined to the servo valve 11 is switched over to the reverse in which side or the right-hand side on the drawing, in which side the No. 17 oil passage L17 is communicated with No. 18 oil passage L18, which is communicated with the manual valve 9, through the axial bore 11b in the servo valve 11 which is communicated with the oil chamber 11a.

In the R position of the manual valve 9, the No. 18 oil passage L18 is communicated with the No. 13 oil passage L13 which is communicated with the fourth speed hydraulic clutch C4 through the groove 9c, and the supplying of oil to the fourth speed hydraulic clutch C4 and the switching over of the selector device sleeve 6 to the reverse side are carried out to establish the reverse transmission train GR.

When the manual valve 9 is switched over from the R position to the forward position D, S or 2, the line pressure is inputted in to a second oil chamber 11c so formed in the servo valve 11 as to face the afore-said first oil chamber 11a, through No. 19 oil passage L19 that branches off from the No. 14 oil passage L14 so as to move the servo valve 11 to the left-hand forward location (as is shown in the drawing). In this operation, the servo valve 11 is kept bound to the reverse location by a binding means until the hydraulic pressure of the hydraulic clutch C1 (hereinafter referred to as the first-speed pressure) of the first speed transmission train G1, which is the transmission train first supplied with the oil with said switching over of the servo valve 11 to the forward location, reaches a predetermined value Ps or higher.

Figure 4:
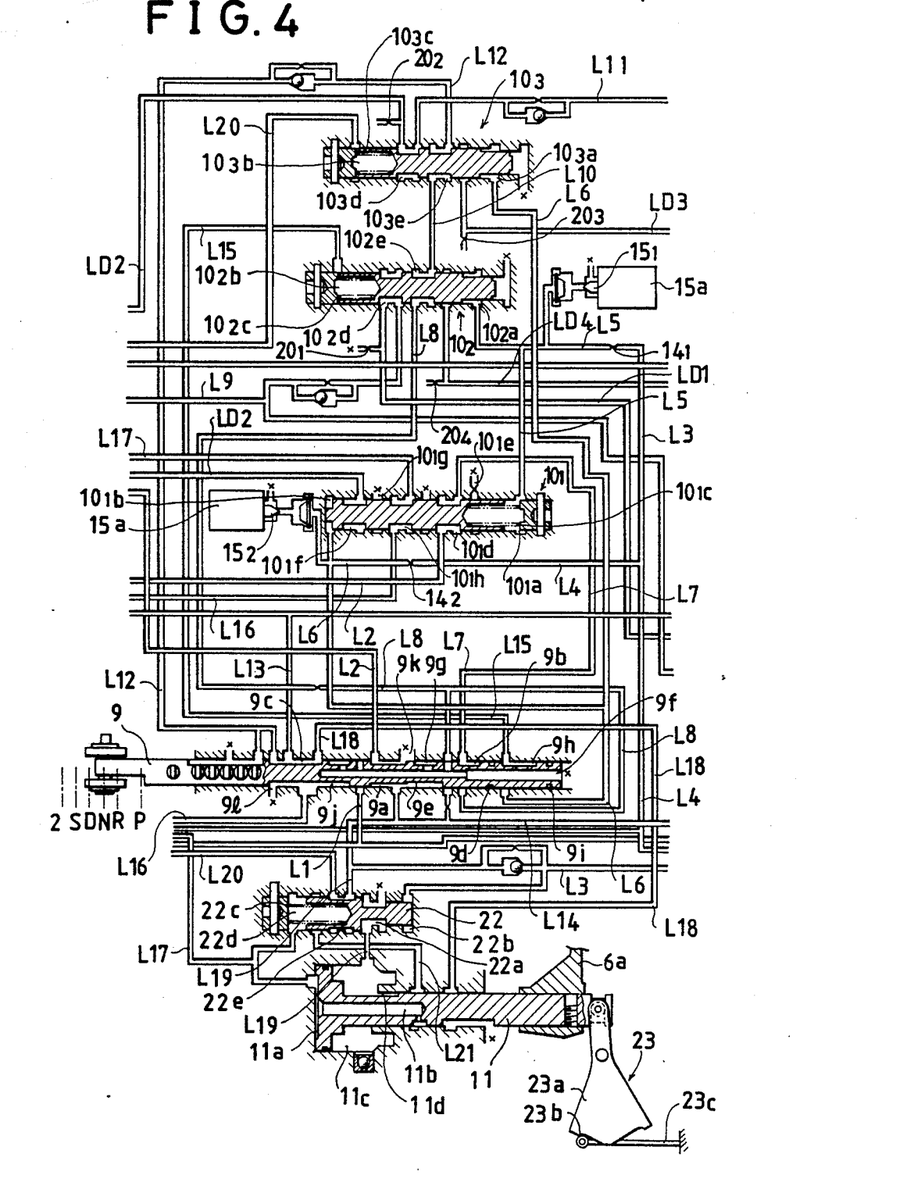
FIG. 4 is an enlarged view of important portions of the hydraulic circuit.

This will now be explained in detail. In this embodiment, the binding means is formed of a control valve 22 interposed in the No. 19 oil passage L19. The control valve 22 is switchable to a non-binding position or the left-hand location on the drawing at which the upstream portion of the No. 19 oil passage L19 is communicated with the downstream portion thereof through an annular groove 22a and to a binding position (which is as is shown in the drawing) at which said communication between the two portions is discontinued. The right end oil chamber 22b in the control valve 22 is communicated with the No. 3 oil passage L3 so as to input the first speed pressure into the oil chamber 22b while a left end spring chamber 22d in the control valve 22 housing a spring 22c is connected with the No. 17 oil passage L17. In this manner, when the manual valve 9 is switched over to the R position the line pressure is inputted into the spring chamber 22d to have the control valve 22 infallibly switched over to the binding position. In addition, there is provided a holding means 23 comprising a lever 23a connected to the servo valve 11 and a resilient member 23c having a top-end pressure contact member 23b which is in contact with the cam surface of the end portion of the lever 23a, so that the servo valve 11 may be held securely in the forward and reverse locations resiliently by the holding means 23.

According to the above-described arrangement, with the manual valve 9 in the R position, the control valve 22 is switched over to and held in the binding position by the spring 22c and the line pressure inputted into the spring chamber 22d. Even when the manual valve 9 is switched over from the R position to one of the forward positions, the control valve 22 remains held at the binding position until the first speed pressure rises to the predetermined value Ps. Inputting of the line pressure into the second oil chamber 11c in the servo valve 11 through the No. 19 oil passage L19 is thus checked so that the servo valve 11 is held at the reverse location by the holding means 23. Thereafter, when the first speed pressure has reached the predetermined value Ps or higher, the control valve 22 is switched over to the non-binding position against the spring 22c and the line pressure is then inputted to the second oil chamber 11c to switch over the servo valve 11 to the forward location.

Thus, when the brake pedal is stepped on and the manual valve 9 is switched over from the R position to one of the forward positions the input shaft 1a of the transmission 1 becomes connected via the first speed transmission train G1 with the output shaft 1b whose rotation is stopped with the brake application by the time the servo valve 11 is actually switched over to the forward location. There is produced a condition in which rotation of the input shaft 1a can be checked by the engagement force of the first speed hydraulic clutch C1, so that the input shaft 1a does not rotate even when the selector device sleeve 6 is moved to come in a neutral condition during the switchover operation of the servo valve 11 in which condition it is neither engaged with the counter gear GRa of the reverse transmission train GR nor with the counter gear G4a of the fourth speed transmission train G4. As a result, the selector device sleeve 6 and the counter gear G4a of the fourth speed transmission train G4 become smoothly engaged with each other in such a condition that both of them have stopped rotating, so that no noise results from the sleeve 6 and gear G4a striking against each other.

Further, when the manual valve 9 is switched over from the R position to one of the forward positions while the accelerator pedal is stepped on in order to get out of a muddy spot or the like, the rotating of the output shaft 1b in the reverse rotational direction is checked, at the time of the switchover of the servo valve 11, by torque acting in the regular rotational direction which arises from the increase to the predetermined value Ps of the first speed pressure and which is transmitted thereinto through the first speed transmission train G1. Therefore, the selector device sleeve 6 and the counter gear G4a of the fourth speed transmission train G4 become intermeshed with each other without large relative revolutions. This prevents both from wearing at their intermeshing portions.

Figure 8:
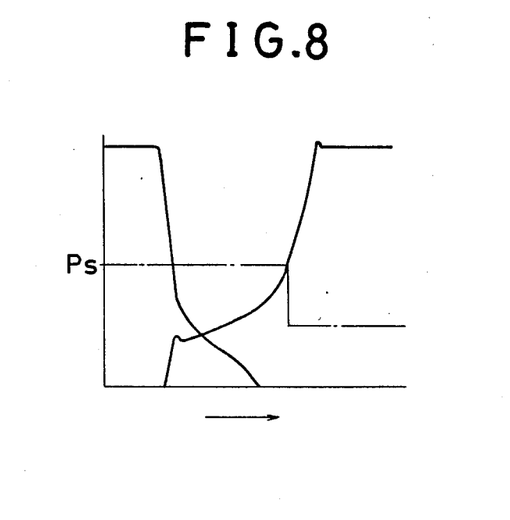
FIG. 8 is a diagram showing changes in the hydraulic pressure of the fourth speed hydraulic clutch and the first speed hydraulic clutch when the manual valve is switched over from the reverse position to the forward position.

FIG. 8 shows changes in the hydraulic clutch C4 (hereinafter referred to as the fourth speed pressure) and the first speed pressure when the manual valve 9 is switched over from the R position to one of the forward positions. The fourth speed pressure is decreased to the atmospheric pressure to open the fourth speed hydraulic clutch C4 before the servo valve 11 is switched over with the rise of the first speed pressure to the predetermined value Ps, so that the counter gear G4a is prevented without failure from being driven by the fourth speed hydraulic clutch C4 when the selector device sleeve 6 and the counter gear G4a of the fourth speed transmission train G4 are engaged with each other in a condition in which the accelerator pedal is stepped on.

In this embodiment, the No. 3 oil passage L3 communicating with the first speed hydraulic clutch C1 is communicated with the No. 14 oil passage L14 so as to supply the oil to the first speed hydraulic clutch C1 when the manual valve 9 is in any one of the forward positions D, S and 2. The purpose of this arrangement is to ensure that the above-described operation by the control valve 22 can be obtained not only when the manual valve 9 is switched over from the R position to the D or S position but also when it is switched over from the R position to the 2 position.

If the control valve 22 gets locked in the binding position due to a foreign object caught therein or the like, the servo valve 11 is held at the reverse location even with the manual valve 9 switched over from the R position to the D or S position. If, in this condition, the oil is supplied to the fourth speed hydraulic clutch C4 in the region where the fourth speed transmission train is established, the reverse transmission train becomes established. In this embodiment, therefore, the No. 20 oil passage L20 communicating with the left end oil chamber $10_{3b}$ in the third shift valve $10_3$ is communicated with the upstream portion of the No. 19 oil passage L19 through the annular groove 22e of the control valve 22 when the control valve 22 is in the binding position. If the manual valve 9 is switched over to the D or S position when the control valve 22 is held at the binding position, the line pressure from the No. 14 oil passage L14 is inputted into the oil chamber $10_{3b}$ through the No. 20 oil passage L20 so that the third shift valve $10_3$ may be held in the right-hand third speed position even when the modulator pressure is inputted to the right end oil chamber $10_{3a}$ in the third shift valve $10_3$, whereby the supplying of the oil into the fourth speed hydraulic clutch C4 can be prevented.

In addition, there is provided a No. 21 oil passage L21 which is communicated with the second oil chamber 11c in the servo valve 11 through the groove 11d formed in the servo valve 11 when the valve 11 is in the reverse location. When the control valve 22 is in the non-binding position, the No. 21 oil passage L21 is communicated with the No. 20 oil passage L20 through the annular groove 22e in the control valve 22. In case where there occurs, as described later, a lag in a return movement to the forward location of the servo valve 11 when the control valve 22 is switched over to the non-binding position with the switching operation of the manual valve 9 from the R position to the D or S position as described in the foregoing, the line pressure is inputted to the left end oil chamber $10_{3b}$ in the third shift valve $10_3$ via a route of the No. 14 oil passage L14 to the No. 19 oil passage L19 to the second oil chamber 11c to the No. 21 oil passage L21 to the No. 20 oil passage L20 so as to have the third shift valve $10_3$ held in the third speed position. The reasons therefore are as follows.

In a transmission in which a speed change operation is controlled by the electronic control circuit, a normal speed change control operation becomes impossible when there occurs an abnormality in the input signal system for signals from the vehicle speed sensor 16b or the like. This can cause, for example, such inconvenience that a shift-down to a lower speed would take place during a high-speed travelling, thus resulting in an overrunning of the engine. In such a transmission, the self-checking functions for detecting the abnormality of the input signal system are added generally to the electronic control circuit 16 so as to control a speed changing operation so that a maximum speed can be attained when the abnormality has been detected. If this is applied to the illustrated embodiment, the fourth speed travelling condition is obtained, i.e., the first and second open-air valves $15_1$, $15_2$ are closed.

Therefore, if the manual valve 9 is switched over from the R position to the D or S position with an abnormality occurring in the input signal system, the oil continues being supplied to the fourth speed hydraulic clutch C4. In this case, with a control valve 22 switched over to the non-binding position, the oil is supplied to the second oil chamber 11c in the servo valve 11 and, at the same time, the oil is discharged from the first oil chamber 11a in the servo valve 11 to an oil discharge port 9 through the No. 17 oil passage L17, an annular groove $10_{1h}$ in the first shift valve $10_1$ being in the second speed position, the No. 16 oil passage L16 and the groove 9j in the manual valve 9. When the viscosity of the oil at a low temperature is high, the supplying of the oil to the second oil chamber 11c and the discharging of the oil from the first oil chamber 11a are delayed to cause the movement of the servo valve 11 to the left-hand forward location to be delayed so that the selector device sleeve 6 still remains in the reverse side in some cases even after the manual valve 9 has been switched over to the D or S position. This, combined with the supplying of the oil to the fourth speed hydraulic clutch C4, keeps the reverse transmission train GR established. When the manual valve 9 is switched over to the D or S position, the oil is supplied to the first speed hydraulic clutch C1 as well, so that the reverse transmission train GR and the first speed transmission train G1 are established simultaneously. This causes the clutch discs in the first and the fourth speed hydraulic clutches C1, C4 to be burnt and worn early.

However, if the movement of the servo valve 11 in the above arrangement to the forward location is delayed, the line pressure is inputted to the left end oil chamber $10_{3b}$ in the third shift valve $10_3$ as described above, so that the third shift valve $10_3$ is held in the right-hand third speed position with the discharging of the oil from the fourth speed hydraulic clutch C4 and the supplying of the oil to the third speed hydraulic clutch C3 carried out properly. Consequently, the third speed transmission train G3 is established, and the above-mentioned inconveniences do not occur.

The purpose of supplying the oil to the servo valve 11 through the No. 16 oil passage L16, the first shift valve $10_1$ and the No. 17 oil passage L17 with the manual valve 9 set to the R position is to switch over the first shift valve $10_1$ to the first speed position when the vehicle is traveling forward at a vehicle speed not lower than a predetermined level (i.e., revolutions per minute (r.p.m.) of the output shaft 1b is not lower than a predetermined value), and thereby prevent the oil passages L16, L17 from being communicated with each other so that the servo valve 11 may be held in the forward location in order to prevent the reverse transmission train GR from being established. According to this arrangement, when the manual valve 9 is switched over from the forward position D, S or 2 to the R position while the accelerator pedal is stepped on in order to get out of a muddy spot or the like, the servo valve 11 is kept held in the forward location so that the selector device sleeve 6 and the counter gear GRa of the reverse transmission train GR can be prevented from being intermeshed with each other in a condition of relative revolutions.

With the manual valve 9 in the N position, the oil is supplied only to the modulator valve 13 through the No. 1 oil passage L1. And with the manual valve 9 in the P position, the No. 1 oil passage L1 is communicated with the No. 16 oil passage L16 through the groove 9j in the manual valve 9 so as to supply the oil to the modulator valve 13 and the first oil chamber 11a of the servo valve 11. This arrangement is made for the purpose of having the servo valve 11 set solely in the reverse location when the manual valve 9 is in the P position. Otherwise, when the manual valve 9 is switched over from one of the forward positions to the P position, the servo valve 11 would be pushed to the right-hand side with the supplying of the oil to the first oil chamber 11a as the valve 9 goes through the R position in the course of the switchover to the P position. As a result, the position of the servo valve 11 would fluctuate in the P position of the manual valve 9, depending on a speed at which the valve passes the R position.

Furthermore, when the manual valve 9 is switched over from the R position or one of the forward positions to the N position, the servo valve 11 is kept held by the holding means 23 to its position occupied prior to the switchover, that is, in the reverse location in case of the switchover of the manual valve from the R position and in the forward location in case of the switchover from one of the forward positions. Here, it is usual that the servo valve 11 is returned to the forward location by means of a return spring or the like at the time of the switchover from the R position to the N or P position of the manual valve when the selector device sleeve 6 is moved to a neutral position in the above return operation, the input shaft 1a of the transmission becomes subjected to no load and rotates and the counter gear G4a of the fourth speed transmission train G4 is then rotated through the fourth speed hydraulic clutch C4 and in this condition the selector device sleeve 6 become engaged therewith, in which time noise is generated from the sleeve 6 and gear G4a striking against each other. However, according to the above-described arrangement of the present invention, the servo valve 11 is kept retained in the reverse location at the time of the switchover from the R position to the N or P position, so that generation of such a noise can be prevented.

A clutch 24 is provided in a fluid torque converter 3 have the input and output sides thereof mechanically connected to each other. A hydraulic circuit 25 is provided for control of the clutch 24. In the circuit 25 are provided third and fourth open-air valves $15_3$, $15_4$ which opened and closed through controls by the electronic control circuit 16 so as to control operation of the clutch 24. This hydraulic circuit 25 is not particularly different from the one previously proposed in the Japanese Pat. application No. Sho 62-15203 by the applicant of the present application, so that detailed explanation thereof is omitted herein.

As described in the foregoing, according to the present invention designed to achieve the first object thereof, when the manual valve is switched over from the R position to the N or P position, the servo valve is kept retained in the reverse location so that the noise otherwise generated by switchover of the selector device to the forward position is prevented. According to the present invention designed to achieve the second object thereof, when the manual valve is switched over from the R position to one of the forward positions, the servo valve is switched over to its forward location after the hydraulic pressure of the hydraulic clutch for the second transmission train has risen to the predetermined level, thus enabling the selector device sleeve and the gear of the first transmission train to be smoothly intermeshed with each other without generating higher relative revolution. These improvements bring about the advantages that generation of the noise and wear of the intermeshing portions of the two are effectively prevented.

What is claimed is:

1. A control apparatus for a hydraulically operated vehicular transmission comprising a plurality of forward transmission trains which are established respectively by individual hydraulic clutches; a reverse transmission train which shares for common use a hydraulic clutch with a predetermined first one of the forward transmission trains; a selector device sleeve which is switchable to a forward side in which said predetermined first forward transmission train is established and to a reverse side in which said reverse transmission train is established; and a hydraulic circuit including a manual valve for switching over the transmission between a forward position, a reverse position, a neutral position and a parking position, a servo valve for forward-/reverse switchover connected to the selector device sleeve so that, when the manual valve provided in said hydraulic circuit is operated for switchover to a reverse position, the servo valve may be pushed by hydraulic pressure to a reverse location at which the selector device sleeve is set to the reverse side and at the same time oil may be supplied to the hydraulic clutch for said predetermined first transmission train, a holding means for holding the servo valve in the reverse location so that, when the manual valve is switched over from the reverse position to the neutral or parking position, the servo valve may be held in the reverse location and, when the manual valve is switched over to the forward position, the servo valve may be pushed by the hydraulic pressure to the forward location at which the selector device sleeve is set to the forward side, and a binding means for, when the manual valve is operated for switchover to the forward position, binding the servo valve to remain in the reverse location by shutting out inputting of the hydraulic pressure into the servo valve until a hydraulic clutch for a second transmission train attains a predetermined level of the hydraulic pressure, said second transmission train being, among the forward transmission trains, the very one to which supplying of the oil is started right with said switchover of the manual valve.

2. A control apparatus for a hydraulically operated vehicular transmission as claimed in claim 1, wherein the servo valve includes an oil chamber for pushing the servo valve to the forward location and a first oil passage communicating said oil chamber with a hydraulic pressure source when the manual valve is in the forward position, and the binding means comprises a control valve interposed in the first oil passage, whereby said control valve is switched over from a binding position, in which its communication with the first oil passage is cut off, to a non-binding position in which its communication with the first oil passage is established, when the hydraulic pressure of the hydraulic clutch for the second transmission train reaches the predetermined level or higher.

3. A control apparatus for a hydraulically operated vehicular transmission as claimed in claim 2, wherein the hydraulic circuit further comprises a plurality of shift valves which control supplying the oil to and discharging it from the hydraulic clutches for said plurality of forward transmission trains to selectively establish these transmission trains and, of these valves, one valve related to control of supplying the oil to and discharging it from the hydraulic clutch for the predetermined first transmission train and the hydraulic clutch for a third transmission train is provided with another oil chamber formed therein for pushing the valve to a shift position in which the supplying of the oil to the hydraulic clutch for the third transmission train is carried out, and wherein a second oil passage communicating with the other oil chamber is connected to the hydraulic pressure source when said control valve is in the binding position.

4. A control apparatus for a hydraulically operated vehicular transmission as claimed in claim 3, wherein the predetermined first transmission train is the highest speed transmission train, and the hydraulic circuit further comprises a third oil passage communicated with said oil chamber formed in the servo valve when the servo valve is in the reverse location and communicated with the second oil passage when the control valve is in the non-binding position.

5. A control apparatus for a hydraulically operated vehicular transmission as claimed in claim 2, wherein when the manual valve is set to the reverse position the hydraulic pressure is so applied to the control valve that it is pushed thereby to the binding position.

6. A control apparatus for a hydraulically operated vehicular transmission as claimed in claim 2, wherein the second transmission train is a first speed transmission train in which is interposed a one-way clutch which allows over-revolution at the output side and the manual valve has a plurality of forward positions, characterized in that the oil is always supplied to the hydraulic clutch for the second transmission train in any forward position of the manual valve.

* * * * *